Feb. 11, 1969 P. T. MAUZEY ETAL 3,427,588

DISTRIBUTION OF MESSAGES TO DATA STATION RECEIVERS ON MULTISTATION LINES

Filed June 29, 1967 Sheet 1 of 2

INVENTORS
P. T. MAUZEY
C. J. VOTAW
H. M. ZYDNEY
BY R C Lipton
ATTORNEY

United States Patent Office 3,427,588

Patented Feb. 11, 1969

3,427,588

DISTRIBUTION OF MESSAGES TO DATA STATION RECEIVERS ON MULTISTATION LINES

Peter T. Mauzey, New York, N.Y., and Clarence J. Votaw, Elberon, and Herbert M. Zydney, Rumson, N.J., assignors to Bell Telephone Laboratories, Inc., Murray Hill, N.J., a corporation of New York Filed June 29, 1967, Ser. No. 650,074
U.S. Cl. 340—147 5 Claims
Int. Cl. H04l 21/00

ABSTRACT OF THE DISCLOSURE

A master station polls party line data stations, each station responding by indicating whether the station transmitter has a message available and whether the station recorder is prepared to receive a message. To pick up messages, the master station selectively starts station transmitters having available messages. When distributing a message, the master station selects those station recorders which are designated by the message heading and which have indicated that they are prepared to receive.

*Field of the invention*

This invention relates to multistation line data receiver selection systems and, more particularly, to the control of message delivery to multistation line data station recorders by a master control station.

*Description of the prior art*

In data message distribution systems, a significant proportion of the data messages comprise only tens of words and therefore require a relatively short time interval for transmission. Since the line time of transmission is short for each message it is advantageous to connect groups of data stations to a common party or multistation line. One example of a data distribution system involves a master station which controls the pickup of messages from the data stations and which controls the distribution of messages to the stations. With respect to distribution, the call-in codes of the station or stations designated by the addresses in the heading of the message are transmitted by the master station to selectively enable the addressee stations to record the message text.

Due to various circumstances, such as off-line printing, instrument testing, mechanical failure and recorder paper depletion, an addressee station may not be prepared to record a message text. In accordance with one distribution system, when a station is unprepared to receive a message it responds that it is not ready. The master station can then try again by resending the call-in code or can transmit the message to an intercept station which can deliver the message at a later time. The transmission and retransmission of call-in codes to unprepared stations requires substantial transmission time, however, and thus depreciates some of the advantages of multistation lines.

*Summary of the invention*

The object of this invention is to reduce unnecessary transmission time due to attempts to call in data station receivers which are unprepared to accept messages.

This invention contemplates a polling cycle wherein the master station polls each data station on the multistation line and the data station, in turn, advises the master station of the availability of a message in the transmitter and the readiness of the recorder to accept a message.

It is a feature of this invention that the master station sends the call-in code of each data station designated by the addresses in the heading of a message which is to be distributed when the data station had previously advised the master station that the recorder is prepared to accept a message. If the data station had advised the master station that the recorder is unprepared to receive a message, the master station is precluded from sending the call-in code even though the message heading designates the station as an addressee.

It is a further feature of this invention that the master station will initiate data message distribution when a message heading designates an addressee station and the station had advised the master station that the receiver is ready to record a message.

In accordance with the illustrative embodiment of this invention, the master station stores the responses of the data stations indicating the readiness of the data station recorders to accept a message. In addition, the master station lists in a memory the identity of each station designated by the addresses in the heading of a message which is to be distributed. When the receiver readiness store indicates that the recorder of the data station listed in the memory is ready to accept a message, the call-in code is transmitted to select the data station. After the call-in code is sent and the recorder is enabled, the list is modified by eliminating the data station identity from the memory. The memory therefore maintains a list of the addressee stations which have not been selected by the call-in codes.

The foregoing and other objects and features of this invention will be more fully understood from the following description of an illustrative embodiment taken in conjunction with the accompanying drawing.

*Brief description of the drawing*

The drawing comprises FIGS. 1 and 2 which when arranged side by side disclose in schematic block form a multistation line data selection system wherein.

*Detailed description*

Figure 1:
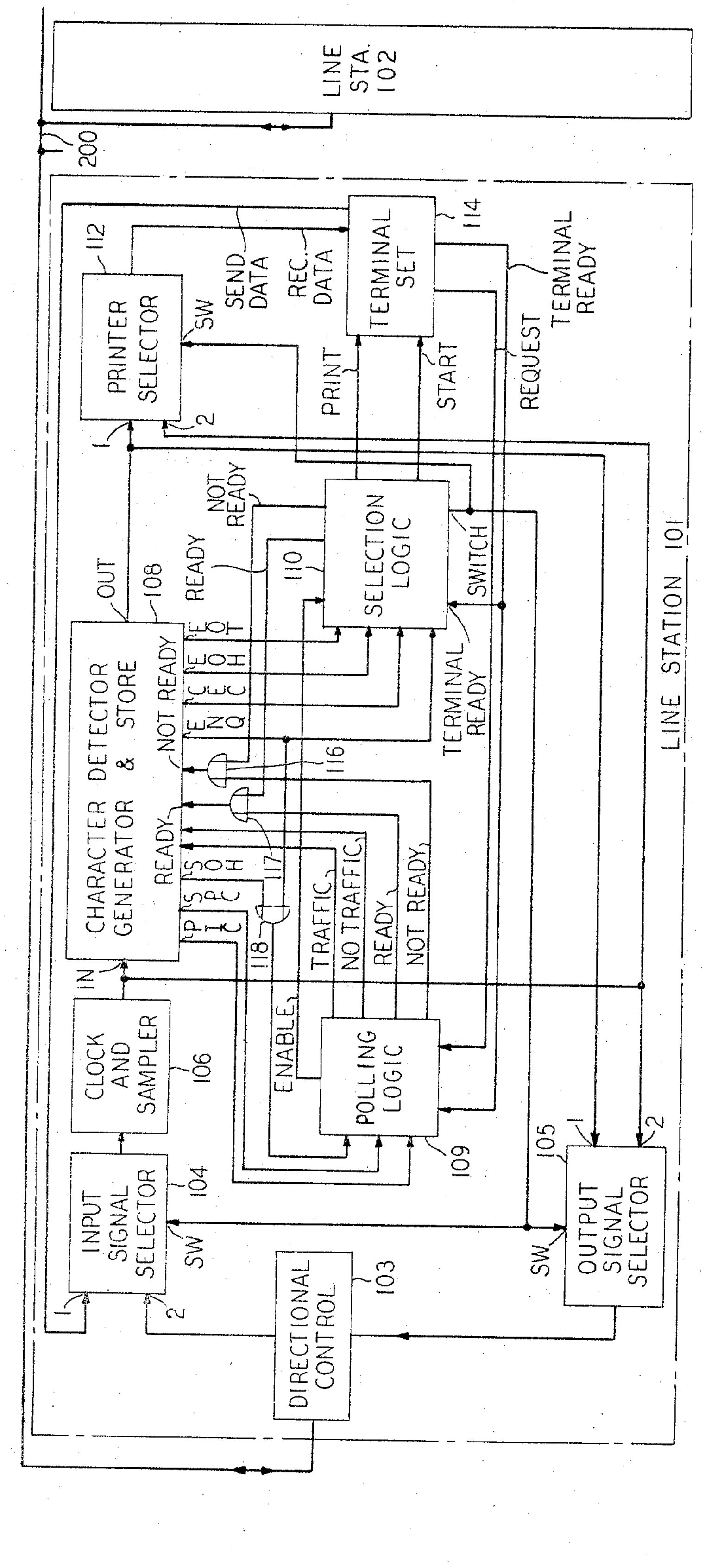
FIG. 1 shows the several data stations and FIG. 2 shows a master station for controlling message pickup and delivery in accordance with this invention.
Figure 2:
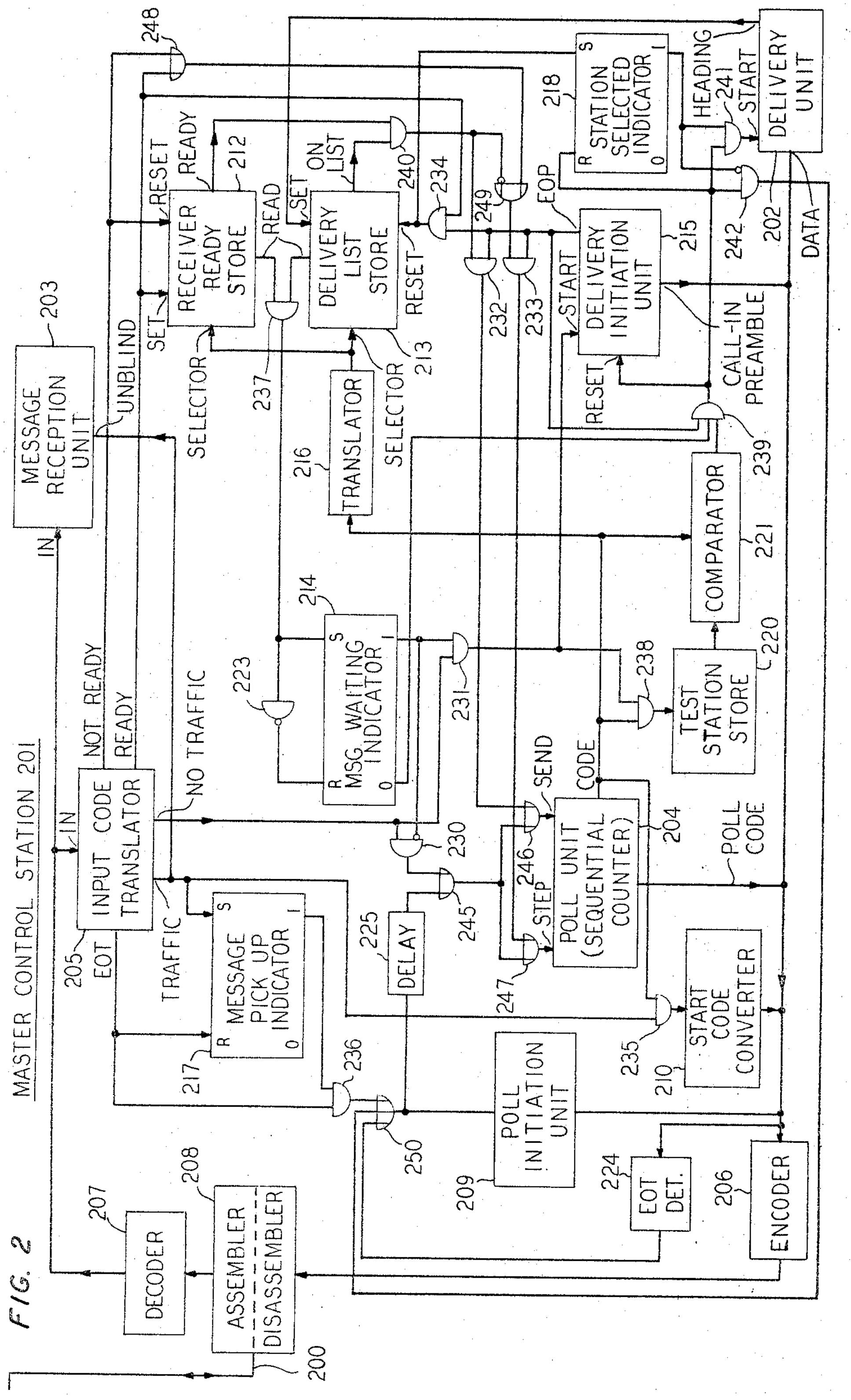

Referring now to the drawing, the master station is generally identified in FIG. 2 as master control station 201. Extending from master control station 201 is a data transmission line, shown in line 200. In this disclosure the transmission line is shown as a single metallic lead which alternatively conveys data from station 201 to the multistation line and provides data for control station 201 from the multistation line. Transmission line 200 may also comprise other forms of communication media such as carrier facilities with appropriate employment of data sets. Transmission line 200 extends to a plurality of remote line stations, such as line station 101 and line station 102 in FIG. 1.

In general, control station 201 functions to control the delivery and pickup of messages to and from the several remote line stations. With respect to message pickup, control station 201 selectively polls each of the line stations to determine whether it has message traffic to send, the line station returning two items of information, whether a message is available thereat and whether the recorder at the polled line station is ready to receive a message. Control station 201 stores or memorizes the condition or state of the station receiver and starts the transmitter at the station in the event that a message is available. With respect to message delivery, when an outgoing message becomes available at control station 201 a list is made of all the stations of address, i.e., all of the station addresses in the heading of the message, which addresses indicate the message destinations. When control station 201 is prepared to send the message it transmits the address codes of each station of address to unblind the receiver at the station if the corresponding station had previously indicated that the receiver thereat is ready to receive a message. Control station 201 thereafter removes the station address from the delivery list and delivers the message to all the unblinded stations of address.

Considering now in more detail the functions of control station 201, the message polling state is initiated after the termination of a message delivery or of a message pickup. At that time control station 201 sends a poll initiation code sequence which functions to place the several outlying stations in the polling state. After placing the line stations in the polling condition, control station 201 proceeds to send a polling code to the next consecutive station, i.e., the next consecutive with respect to the station previously polled. The remote line station which is polled responds by sending an answer-back code indicating whether a message is available in the station transmitter and, additionally, whether the recorder thereat is prepared to receive a message.

Considering the first item, if the station responds that there is no message available, and, further, assuming that control station 201 does not have a message to deliver, the poll code of the next station is transmitted. If the outlying station responds that a message is available, control station 201 sends a start code sequence individual to the outlying station. The start code sequence operates to selectively start the transmitter at the polled outlying station. The message is thus received and recorded at control station 201. At the termination of the message the end-of-transmission code sequence is transmitted. This sequence is recognized by control station 201 and a new poll initiation code is generated to start a new polling sequence.

With respect to the second item of information returned by the outlying station, the condition of each outlying station receiver is memorized by control station 201. In accordance therewith a receiver-ready store circuit stores the information as to whether or not the receiver at each of the outlying stations is in condition to receive a message.

Considering now message delivery, when a message becomes available in the message delivery unit of control station 201 the heading of the message with its one or more address codes is read and each of the addresses is listed by control station 201 in a delivery store. Thereupon an indicator is set when an address is listed and the receiver-ready store indicates that the receiver at the corresponding address station is ready to receive a message. The message delivery circuit now awaits a response from any station that no message traffic is available thereat, which response must occur as previously described during the polling sequence.

Assuming now that a no-traffic-available response is received and the message indicator is set, control station 201, instead of polling the next station, sends a call-in preamble. At the several outlying stations the recognition of the call-in preamble operates to place the stations in the delivery condition. Control station 201 now sequentially examines all addresses on the delivery list and compares each address with the receiver-ready store to determine if the corresponding station of address is ready to receive a message. If this comparison reveals that an address is stored in the list and that the addressee station is ready to receive, then control station 201 sends the call-in code of the corresponding station. It is noted that this call-in code may be the same as the station's poll code. The outlying stations, however, being in the call-in or relivery state, recognize this code as the call-in code rather than as the poll code. The outlying station selected thereby again responds whether the receiver thereat is ready and if the receiver is available selects the receiver for subsequent delivery of the message. At control station 201 the response that the station receiver is ready is noted and the station address is eliminated from the list. In the event, however, that the outlying station responds that the receiver is not ready, the address is maintained in the list but the receiver-ready store is modified to indicate the change in the receiver condition.

Control station 201 continues the cycle through the address list until all of the stations have been examined and compared with the receiver-ready store. After the cycle is completed no station having the corresponding station receiver in the ready condition remains on the list. This removes the set indication of the indicator. At this time control station 201 starts the delivery of the message text. The message text is preceded by a code sequence which unblinds the selected stations, unselecting all of the other outlying stations. At the termination of the message delivery the end-of-transmission character is sent, blinding the selected stations. At the control station the end-of-transmission character is detected and thereupon the poll initiation code is transmitted to start a new polling sequence.

It is noted that with respect to the stations of address having receivers not ready, the address list continues to store the station identities. This permits a subsequent delivery of the message to those stations when the receivers thereat become available.

Poll unit 204, FIG. 2, provides the polling codes. Poll unit 204 comprises a conventional code generating unit having a plurality of sequential positions and when at each position presents a corresponding polling code to output lead CODE. When energized by way of input lead STEP, poll unit 204 advances to the next position to present the next polling code in the predetermined sequence to the output terminals connected to the CODE lead. These polling codes are also concurrently presented to the output terminal connected to lead POLL CODE and thence to encoder 206 when the input SEND lead is enabled or energized. It is noted that although lead CODE and lead POLL CODE are each shown as single output leads, they may individually comprise a plurality of leads to convey the several elements of the output code in parallel. Accordingly, these output leads may be considered groups of parallel leads, each lead in the group arranged to convey an element of the data code.

Control station 201 is also provided with poll initiation unit 209 and start code converter 210. Poll initiation unit 209 is also a code generator which, when enabled at its input, provides to its output and thence to encoder 206 the poll initiation code sequence. Start code converter 210 is arranged to accept a polling code from poll unit 204 by way of transfer gate 235, to convert the polling code to a corresponding transmitter start code, and to apply to the output thereof the transmitter start code sequence which is passed to encoder 206.

Encoder 206 accepts data elements at its input and applies them to the disassembler portion of assembler/disassembler 208. The disassembler portion, in turn, shifts the code elements out serially to line 200. It is noted that the disassembler portion may be arranged to concurrently accept two or more data characters.

The assembler portion of assembler/disassembler 208 accepts the incoming character code elements serially from line 200 and applies them to decoder 207, which, in turn, passes them, a character at a time, to input code translator 205 and message reception unit 203. Message reception unit 203 includes a message recording unit which is enabled to record the data applied to terminal IN when the lead extending to its terminal UNBLIND is enabled. Message reception unit 203 is preferably arranged to blind itself in response to the application of an end-of-transmission data character.

Input code translator 205 accepts data from decoder 207 and pulses its several output leads in accordance with the data code applied thereto. For example, when the end-of-transmission character is applied to input code translator 205, output lead EOT is pulsed. Similarly, when an outlying station responds with a data code indicating that traffic is available, or, alternatively, that no traffic is available, input code translator 205 pulses output leads TRAFFIC or NO TRAFFIC. Finally, output leads READY and NOT READY are pulsed when input code translator 205 receives a data character from the outlying station that the receiver thereat is READY or NOT READY.

The delivery of messages is provided by delivery unit 202. Delivery unit 202 includes a data transmitter which may comprise, for example, a teletypewriter, a magnetic drum, etc. When a message is supplied to delivery unit 202 the heading thereof is scanned and the address codes in the heading are provided to lead HEADING. It is noted that although a single lead is shown, the lead HEADING preferably comprises a plurality of leads, each of the leads corresponding to an address and thus to an associated line station. Accordingly, delivery unit 202 includes a translator which energizes a selected one of the HEADING leads in response to each address code in the heading of the message. Thereafter when an enabling input is provided to delivery unit 202 via terminal START, the message text data is passed through output terminal DATA to encoder 206. The message transmission is terminated by delivery unit 202 when the end-of-text character is transmitted.

The outlying receiver conditions are stored by receiver-ready store 212. Preferably, storage is provided by a plurality of memory cells, each cell individual to an outlying station. A memory cell, in turn, may comprise a conventional flip-flop. The storage of a receiver condition is provided by input terminals SET and RESET, in accordance with the conditions of input lead SELECTOR. As described hereinafter, input lead SELECTOR may comprise a plurality of leads, each individually associated with an outlying station. When a pulse is provided to input terminal SET or RESET, the energized one of the SELECTOR leads directs the input pulse to the memory cell of the corresponding outlying station, thereby placing the cell in one or the other binary conditions in accordance with the input pulse.

Output lead READY of receiver-ready store 212 is energized when a memory cell is selected by the SELECTOR leads and the memory cell is in the SET condition. Receiver-ready store 212 also provides indications to output terminal lead READ, which terminal lead extends to gate 237. It is noted that output terminal lead READ may comprise a plurality of leads, each lead individual to a memory cell and applying an enabling input to gate 237 when the corresponding memory cell is in the SET condition. Gate 237, accordingly, is preferably arranged as a plurality of AND gates, one for each memory cell, with the outputs coupled together by way of an OR gate.

The delivery list store is generally indicated by block 213. This store contains a plurality of memory cells corresponding to the memory cells in receiver-ready store 212. Each of the cells is either SET or RESET when a pulse is applied to the corresponding SET or RESET input leads, in accordance with the energized one of the SELECTOR leads in the same manner as the memory cells in receiver-ready store 212 are controlled. In addition, the energizing of output lead ON LIST is provided by a memory cell when selected by the SELECTOR leads and when the cell is in the SET condition in substantially the same manner as the energization of the READY lead of receiver-ready store 212. Finally, output terminal lead READ provides enabling inputs to gate 237 in accordance with the conditions of the several memory cells. Lead READ may comprise a plurality of leads arranged in substantially the same manner as the READ lead of receiver-ready store 212 to enable corresponding ones of gates 237 when the memory cells individual thereto are in the SET condition.

The output of gate 237 is passed to the SET input of message waiting indicator 214 and to the RESET input of indicator 214 by way of inverter 223. Outgoing message waiting indicator 214 may comprise a conventional flip-flop whose output terminal "1" goes high when it is SET and whose output terminal "0" goes high when it is RESET.

The conditioning of the SELECTOR input leads to receiver-ready store 212 and delivery list store 213 is provided by translator 216. Translator 216 is connected to output lead CODE of poll unit 204. Translator 216 functions to examine the polling code output of poll unit 204 and, consequently, the position of poll unit 204, and translate the polling code by energizing one of the SELECTOR leads, which lead corresponds to the position of the poll unit and, therefore, corresponds to a particular one of the outlying stations.

The call-in preamble is provided by the delivery initiation unit, generally indicated by block 215. Delivery unit 215 comprises a conventional code generator which, when enabled at its START terminal, applies the call-in preamble code sequence to encoder 206. In addition, delivery initiation unit 215 is arranged to pass an enabling condition to output terminal EOP after generating the call-in preamble and to hold this enabling condition until pulsed at input terminal RESET.

The message pickup state and the station selector states are determined by message pickup indicator 217 and station selected indicator 218, respectively. Indicators 217 and 218 are flip-flops, arranged similarly to message waiting indicator 214. The functions of indicators 217 and 218 will be described in further detail hereinafter.

Master control station 201 also includes test station store 220, which can accept a code at the input thereof, store the code until the application of a new code, and apply the code elements to the output. These code elements are applied to comparator 221, which compares the stored code in store 220 with the polling code on the output lead CODE of poll unit 204, passing an enabling signal to gate 239 when these codes are identical.

Also included in master control station 201 is end-of-transmission detector 224, which functions to read the input code applied to encoder 206. End-of-transmission detector 224 pulses OR gate 250 when an end-of-transmission code sequence is applied to encoder 206. Another component of master control station 201 is delay unit 225, which provides a delay corresponding to the interval for transmitting the poll initiation sequence, for reasons described hereinafter.

A plurality of gates are also utilized in master control station 201, such as AND gates 230 through 242 and OR gates 245 through 250. Certain of the gates include "not" or "inverting" leads. For example, one of the inputs to gate 230, namely, the input from output terminal "1" of outgoing message waiting indicating 214, comprises an inverting input wherein gate 230 is enabled by indicator 214 when output terminal "1" is in the low or disabled condition.

The line stations in FIG. 1, such as line stations 101 and 102, are each arranged in substantially the same manner. Each line station contains a terminal set, such as set 114 indicated in line station 101. This set comprises a data source for applying data to output terminal lead SEND DATA when an enabling signal is applied to input terminal lead START. Terminal set 114 also includes a data sink for accepting data from input terminal lead REC DATA and printing or recording the data when an enabling signal is applied to input terminal lead PRINT. In addition, terminal set 114 includes various keys and lamps whereby the attendant may operate a particular key or keys to indicate that a message is available for transmission. With the message available at the data source the output terminl lead REQUEST is energized by terminal set 114. If the data sink is available for accepting data, i.e., if it is operationally prepared and is connected to input terminal lead REC DATA and is supplied with recording paper, etc., then output terminal lead TERMINAL READY is energized.

Line station 101 also includes directional control 103, input signal selector 104, output signal selector 105 and printer selector 112, each of which is arranged to pass data therethrough. Directional control 103 is a hybrid arrangement which accepts the serial data from multistation line 200 and passes it to input terminal "2" of input signal selector 104. When data is applied to directional control 103 from output signal selector 105, this data is passed back to multistation line 200. Each of signal selectors 104, 105 and 112 is arranged to either pass data from its input "1" terminal or its input "2" terminal to the output thereof. The control of each selector is provided by the lead to its input SW terminal which determines whether or not the data from the input "1" terminal or input "2" terminal will be accepted.

Line station 101 also includes character detector generator and store 108 which is arranged to accept serial data at terminal IN and pass serial data to terminl OUT. In addition, character detector generator and store 108 will generate specific codes for application to terminal OUT when input leads TRAFFIC, NO TRAFFIC, READY or NOT READY are energized and, in addition, is arranged to energize output leads PIC, SPC, SOH, ENQ, CEC, EOH and EOT when specific data codes are stored therein. Preferably, character detector generator and store 108 comprises a shift register having a sufficient number of stages for storing two data characters, together with input networks for coding the stages with predetermined code characters and output networks for detecting predetermined code characters when stored in the several stages.

Line station 101 also includes logic units, such as polling logic 109 and selection logic 110. These provide various output signals in response to various permutations of input signals, as described in detail hereinafter. Clock and sampler 106 in line station 101 samples signals provided by input signal selector 104 and passes those signals to the output thereof. Clock and sampler 106 may also provide appropriate shift pulses for character detector generator and store 108.

Assuming now that the system is in the polling state, and, further, assuming that a station polling code has just been passed to line 200, master control station 201 awaits a response from the polled outlying station. This response will provide two items of information, namely, the availability of a message at the polled station and the readiness of the receiver thereat.

When the polled outlying station responds with the information character indicating the availability of a message, this character is passed by way of transmission line 200 to assembler/disassembler 208. The assembler portion applies the serial data to decoder 207 which, in turn, passes the data character to input code translator 205. Similarly, the item of information indicating the readiness of the receiver at the polled outlying station is passed by way of assembler/disassembler 208 and decoder 207 to input code translator 205. Input code translator 205, in turn, energizes output lead TRAFFIC if the outlying station responded that a message is available and, alternatively, energizes the output lead NO TRAFFIC if the outlying station responded that no message is available. In addition, input code translator 205 energizes output lead READY if the polled outlying station responded that the receiver thereat is ready to receive and, alternatively, energizes output lead NOT READY if the polled outlying station receiver is not available to receive a message. At this time the energization of either lead READY or NOT READY is passed to the SET or RESET input of receiver-ready store 212. Since poll unit 204, in polling the outlying station, is concurrently applying the corresponding poll code to translator 216, the input SELECTOR lead of receiver-ready store 212 corresponding to the polled outlying station is energized and the associated memory cell is either set or reset in accordance with the condition of the polled outlying station. Thus, the response of the polled outlying station with respect to the condition of the receiver thereat is inserted in receiver-ready store 212. Of course, if the condition of the receiver has not changed since the prior response of the same station to the polling, the condition of the associated memory cell remains the same.

Returning now to the response of the polled outlying station with respect to the availability of a message for transmission and assuming now that the outlying station responds that no message is available, then output lead NO TRAFFIC of input code translator 205 is energized.

Further assuming that a message is not now awaiting delivery from delivery unit 202 and message waiting indicator 214 is reset, as described hereinafter, then gate 230 is enabled and the pulse on lead NO TRAFFIC is passed through gate 230 and OR gate 245 to OR gates 246 and 247. This applies a pulse to input lead STEP of poll unit 204 whereby the unit first advances to the next sequential position corresponding to the next sequential outlying station to be polled. Input lead SEND is also pulsed by way of OR gate 246 whereby the poll code of the outlying station is passed to output lead POLL CODE and then to encoder 206. Encoder 206, in turn, applies the station poll code to the disassembler portion of assembler/disassembler 208 and the poll code is thus passed to multistation line 200. Accordingly, the next station thus is polled for message traffic.

It is seen that as a result of the reception of the two items of information from the outlying polled station, if the outlying transmitter does not have a message the next successive outlying station is polled and, in addition, in response to the information of the readiness of the receiver at the station the memory cell corresponding to the station in receiver-ready store 212 is placed in a condition indicating the readiness of the outlying station receiver.

Assuming that the polled outlying station responds that traffic is available, and, further, responds with information as to the availability of the receiver, the latter information is inserted in receiver-ready store 212, as previously described, and output lead TRAFFIC of input code translator 205 is pulsed. The pulsing of lead TRAFFIC sets message pickup indicator 217 and enables transfer gate 235. Gate 235, when enabled, transfers the poll code from output lead CODE of poll unit 204 to start code converter 210. This is the poll code of the responding outlying station and start code converter 210 converts the code to the transmitter start code individual to the responding station. This code is passed through encoder 206 and assembler/disassembler 208 to line 200. The pulsing of lead TRAFFIC also passes an enabling signal to input lead UNBLIND of message reception unit 203, enabling this unit to record incoming data.

With the start code of the outlying station transmitted, the transmitter thereat is started, as described hereinafter, and a message is received over line 200. This is passed by way of assembler/disassembler 208 and decoder 207 to message reception unit 203 whereby the message text is recorded. The characters, of course, are also monitored by input code translator 205. When the end-of-transmission character is received message reception unit 203 blinds itself and input code translator 205 pulses output lead EOT. The pulse on lead EOT is passed to gate 236, which has been enabled by the setting of message pickup indicator 217. Thus, AND gate 236 pulses OR gate 250 and OR gate 250, in turn, pulses poll initiation unit 209 and delay unit 225. The energization of lead EOT also resets message pickup indicator 217.

Considering now the energization of poll initiation unit 209; this unit generates the poll preamble code sequence, as previously described, passing it to encoder 206, and thus, by way of assembler/disassembler 208, to line 200. Accordingly, the poll preamble code sequence is transmitted to the outlying stations, placing them in the polling condition, as described hereinafter.

The pulse provided at the output of OR gate 250 and applied to delay unit 225 is passed on to OR gate 245 after a delay corresponding to the interval for generating the poll preamble code sequence. Thus, after the poll preamble code sequence is passed to line 200, OR gates 246 and 247 are pulsed whereby, as previously described, poll unit 204 steps to the next position corresponding to the next outlying station to be polled and the poll code is passed on to line 200.

It is therefore seen that after the end-of-transmission of an incoming message is received a new polling sequence is initiated, starting with the poll preamble code sequence and followed by the station polling code of the next consecutive outlying station. With the polling of the next station the above-described sequence is repeated.

At the outlying station, such as line station 101, the incoming data character received from line 200 is passed through directional control 103 to input signal selector 104, which is normally enabled to pass data from input terminal "2" to the output thereof and then to clock and sampler 106. The data is thus repeated and passed to terminal IN of character detector generator and store 108.

Assuming first that a poll preamble code sequence is received, this is detected by character detector generator and store 108 and output lead PIC is pulsed. This pulse is passed to polling logic 109, setting the polling logic in the polling state. If master control station 201 proceeds to poll the outlying stations, each of the station poll codes is similarly passed to character detector generator and store 108 until the poll code individual to line station 101 is received. At this time character detector generator and store 108 pulses output lead SPC, passing an enabling pulse by way of this lead to polling logic 109.

Polling logic 109 is controlled by leads REQUEST and TERMINAL READY from terminal set 114. As previously described, lead REQUEST is energized if a message is available and lead TERMINAL READY is energized if the data sink in terminal set 114 is available to receive a message. With the pulsing of polling logic 109 by way of lead SPC, lead TRAFFIC or NO TRAFFIC is pulsed in accordance with the condition of lead REQUEST. Specifically, if lead REQUEST is energized lead TRAFFIC is pulsed and if lead REQUEST is not energized lead NO TRAFFIC is pulsed. Additionally, with the pulsing of polling logic 109 by way of lead SPC, leads READY and NOT READY are pulsed in accordance with the condition of lead TERMINAL READY. Specifically, lead READY is pulsed if lead TERMINAL READY is energized and lead NOT READY if lead TERMINAL READY is not energized. Leads TRAFFIC and NO TRAFFIC extend to character detector generator and store 108 and leads READY and NOT READY also extend to character detector generator and store 108 by way of OR gates 117 and 116, respectively. Thus, in response to the station polling code, polling logic 109 codes character detector generator and store 108 with two characters indicating the availability of a message in the data source of terminal set 114 and the readiness of the receiver.

The pulsing of polling logic 109 by way of lead SPC also energizes output lead ENABLE, which energization is passed to selection logic 110. This puts selection logic 110 in the station polled state. In this state selection logic 110 passes an energizing signal through lead SWITCH to input terminal SW of output signal selector 105. The characters coded in character detector generator and store 108 by polling logic 109 are thus clocked out through input terminal "1" of output signal selector 105 and then by way of directional control 103 to multistation line 200 and then back to master control station 201. Line station 101, therefore, responds to its station polling code by returning information relative to the availability of a message thereat and the readiness of the receiver.

In the event that a message is available at line station 101 and master control station 201 sends the appropriate transmitter start code, this code is passed to the input of character detector generator and store 108 and the detection of the code pulses lead CEC. The pulsing of lead CEC is passed to selection logic 110 and, with selection logic 110 in the station polled state, output leads START and PRINT are energized to enable the data source to send the data message and enable the data sink to monitor the message. In addition, output lead SWITCH is energized to control selectors 104, 105 and 112. Specifically, input signal selector 104 is switched to accept data from input terminal "1"; output signal selector 105 is switched to accept information from input terminal "2" and printer selector 112 is enabled to accept data from input terminal "2."

Tracing now the data from terminal set 114 applied to output lead SEND DATA, the message text characters are passed through input terminal "1" of input signal selector 104 to clock and sampler 106. Character detector generator and store 108 samples the various data characters from clock and sampler 106 and the output of clock and sampler 106 also passes through input terminal "2" of output signal selector 105 and then through directional control 103 to multistation line 200 and back to the master control station 201. In addition, the output of clock and sampler 106 is passed by way of input terminal "2" of printer selector 112 to lead REC DATA and then to the data sink in terminal set 114 thereby monitoring the outgoing message.

When the start-of-heading character is transmitted from terminal set 114 and monitored by character detector generator and store 108 output lead SOH is pulsed and this pulse is passed by way of OR gate 118 to polling logic 109. The pulsing of polling logic 109 drops the unit from the polling state and restores it to its initial condition. It is noted that the start-of-heading character is also received by all other outlying stations and the effect at these other stations is to also restore the polling logic unit therein corresponding to polling logic 109 to the initial condition.

The message is transmitted until the end-of-transmission character is generated. This character is detected by character detector generator and store 108, pulsing output lead EOT. The pulsing of lead EOT restores selection logic 110 to the idle condition, stopping the data source and blinding the data sink. Line station 101 is thus restored to its initial condition.

Assuming now that a message including a heading and a message text is delivered to delivery unit 202, the heading of the message is read in delivery unit 202 and each station address is decoded and passed by way of lead HEADING to the set input of delivery list store 213. In response to the reading of each address code, delivery unit 202 energizes a corresponding one of the HEADING leads. Accordingly, in response to the reading of each address, the memory cell individual to the outlying station designated by the address code has a bit inserted therein, i.e., the memory cell is set. Thus, after a complete reading of the heading by delivery unit 202, each of the memory cells in delivery list store 213 corresponding to the several addressee stations has a bit inserted.

The contents of receiver-ready store 212 and delivery list store 213 are continuously examined by gate 237 by way of leads READ which extend to each store. As previously described, when a bit is stored in a memory cell of receiver-ready store 212, and a bit is stored in the corresponding memory cell of delivery list store 213, the corresponding READ leads of receiver-ready store 212 and delivery list store 213, respectively, are energized, enabling gate 237. This pulses the SET input of message waiting indicator 214. In the SET state message waiting indicator 214 enables AND gate 231 and disables AND gate 230. This SET state of message waiting indicator 214 indicates that the message in delivery unit 202 is addressed to a station having a receiver thereat in the READY condition. With message waiting indicator 214 SET, gate 231 enabled, and gate 230 disabled, the station now awaits a NO TRAFFIC response from an outlying station before terminating the polling state and initiating a message delivery state.

Assuming now that master control station 201 polls an outlying station and a NO TRAFFIC response is received, output lead NO TRAFFIC of input code translator 205 is pulsed. With gate 230 disabled, this pulse is not passed to OR gate 245 to poll the next station. Gate 231, however, is enabled and the pulse on lead NO TRAFFIC is passed through gate 231 to AND gate 238 and to input lead START of delivery initiation unit 215.

The pulsing of transfer gate 238 enables the gate to read the poll code on output lead CODE of poll unit 204 and transfer this poll code to test station store 220. Thus, the poll code of the outlying station last polled is memorized by test station store 220.

The pulse applied by AND gate 231 to input lead START of delivery initiation unit 215 enables the unit to generate the call-in preamble code sequence. This code sequence is passed to output lead CALL-IN PREAMBLE and then by way of encoder 206 and assembler/disassembler 208 to multistation line 200. After the generation and transmission of the call-in preamble, delivery initiation unit 215 energizes output lead EOP. The energization of output lead EOP enables AND gates 232, 233 and 234.

At this time, it is recalled, poll unit 204 is applying the poll code of the last polled station to output lead CODE. This code is passed to translator 216, which energizes a predetermined one of output leads SELECTOR. The energized lead corresponds to the outlying station previously polled. With the SELECTOR lead energized, receiver-ready store 212 pulses output lead READY in the event that the momory cell individual to the outlying station has a bit inserted therein indicating that the outlying station receiver is available to receive a message. Similarly, delivery list store 213 pulses lead ON LIST in the event that the memory cell associated with the outlying station has a bit inserted therein indicating that the message is destined for this particular outlying station.

In the event that the message is to be transmitted to the outlying station and the receiver is ready thereat, AND gate 240 is enabled, thus pulsing AND gate 232. AND gate 232 was previously enabled by lead EOP of delivery initiation unit 215, thereby passing the pulse from AND gate 240 to OR gate 246. Accordingly, OR gate 246 energizes the input SEND lead of poll unit 204, whereby the poll code is passed to output lead POLL CODE. Since the call-in preamble code sequence has previously been transmitted to the outlying station, the poll code of the outlying station will now be recognized by the station as a call-in code. This call-in code is passed by way of encoder 206 and assembler/disassembler 208 to outlying station 200. It is, of course, apparent that the poll code, utilized herein as the call-in code, may go through a translation process to provide a call-in code separate and distinct from the station poll code.

The outlying station, upon the reception of its call-in code, responds whether or not it is ready to receive and selects itself if it is ready to receive, as described in detail hereinafter. Assuming first that it responds that it is ready to receive, the code character monitored by input code translator 205 energizes output lead READY. This pulses AND gate 234, passing a pulse therethrough to input lead RESET of delivery list store 213 and to the SET input of station selected indicator 218. The setting of station selected indicator 218 indicates that at least one station receiver has been selected and the receiver thereat is in the READY condition. The pulsing of input lead RESET of delivery list store 213 resets the memory cell corresponding to the outlying station, the pulse preferably being steered to the memory cell by the energized SELECTOR lead which, as previously described, is associated with the selected outlying station.

The pulsing of lead READY also passes a pulse to OR gate 248 which, in turn, applies a pulse to AND gate 233 by way of OR gate 249. The output of AND gate 233 is appplied to OR gate 247, energizing input lead STEP of poll unit 204. Accordingly, poll unit 204 advances to the next position which corresponds to the next consecutive outlying station. This provides a new poll code to translator 216 and the memory cells corresponding to the next outlying station in receiver-ready store 212 and delivery list store 213 are concurrently examined in the same manner is previously described.

In the event that the outlying station has responded that it is not ready to receive, output lead NOT READY of input code translator 205 is pulsed, thus pulsing input lead RESET of receiver-ready store 212, removing the bit stored in the memory cell corresponding to the outlying station. In addition, OR gate 248 is pulsed and the pulse is passed by way of OR gate 249 and AND gate 233 to OR gate 247. Accordingly, a STEP pulse is applied to poll unit 204, advancing the position of the unit whereby a new poll code is passed to translator 216 and the memory cells of the next station are examined. It is noted that when the outlying station responds that the receiver thereat is not ready, the memory cell in delivery list store 213 is not reset and the indication that the station is designated by the message heading is maintained.

Assuming now that poll unit 204 has stepped to a position where the corresponding outlying station is not a station of address, or the outlying station has previously responded that the receiver thereat is not ready to receive, then either output lead READY of receiver-ready store 212 or output lead ON LIST of delivery list store 213 is not energized. Accordingly, AND gate 240 is not enabled and the low condition at the output thereof is inverted by OR gate 249, enabling AND gate 233. Thus, OR gate 247 is energized, passing a step signal to poll unit 204. Accordingly, poll unit 204 proceeds to step to the next station without generating the call-in code at the output thereof, and the states of the memory cells in stores 212 and 213 are not modified.

In this manner the memory cells of each of the stations in receiver-ready store 212 and delivery list store 213 are examined to determine if the station is designated as an addressee by the message heading and if it had previously responded that it is ready to receive. In this event the call-in code of the station is transmitted and the outlying station responds whether or not it is presently available to receive a message. If it is ready to receive a message its memory cell in delivery list store 213 is reset; if it is not ready to receive a message its memory cell in receiver-ready store 212 is reset. Poll unit 204 is then stepped and all of the station cells in both receiver-ready store 212 and delivery list store 213 are examined until poll unit 204 has stepped back to the initial position corresponding to the last polled station. At this time the poll code presented to output lead CODE corresponds to the poll code presently stored by test station store 220.

With the codes presented by both input leads to comparator 221 identical, the comparator energizes its output to enable one input to AND gate 239. A second input lead to AND gate 239 is also enabled by output lead EOP of delivery initiation unit 215.

The third input lead of AND gate 239 extends to the "0" output terminal of message waiting indicator 214. All of the stations have now been examined and with respect to addressee stations that are ready either the cell in receiver-ready store 212 has been reset or the corresponding memory cell in delivery list store 213 has been reset. Therefore, corresponding cells in the stores are no longer both set whereby AND gate 237 is no longer enabled. This passes a low condition to inverter 223 which operates to reset message waiting indicator 214. Accordingly, the third input of AND gate 239 is energized and AND gate 239 is enabled, resetting delivery initiation unit 215 and pulsing AND gate 241. With AND gate 241 enabled by station selected indicator 218, input lead START of delivery unit 202 is pulsed, whereby the data source therein is started and sends the message text to output lead DATA and then, by way of encoder 206 and assembler/disassembler 208, to multi-station line 200. AND gate 239 also resets station selected indicator 218.

At the end of the message the end-of-transmission character is sent by delivery unit 202. This character is detected by EOT detector 224, which, in response thereto, pulses OR gate 250. The pulsing of OR gate 250 again operates poll initiation unit 209 and passes a pulse by way of delay unit 225 to OR gate 245. Accordingly, a new polling cycle is initiated wherein the poll initiation code is first passed to the line, followed by a station poll code, as previously described.

Recalling now that the delivery state is initiated by the transmission of the call-in preamble code sequence, at the outlying station the reception of this sequence when passed to character detector generator and store 108 energizes output lead ENQ. The pulsing of this lead passes a pulse by way of OR gate 118 to polling logic 109, taking the unit out of the polling state if it is presently in this state. In addition, the pulsing of lead ENQ passes a pulse to selection logic 110, switching this unit to the call-in state. Master control station 201 now proceeds to transmit the various call-in codes of the addressee stations. When the call-in code of line station 201 is received by character detector generator and store 108, lead CEC is pulsed, pulsing, in turn, selection logic 110. Selection logic 110, in response thereto, pulses output lead READY or output lead NOT READY in accordance with the condition of input lead TERMINAL READY. Specifically, output lead READY is pulsed if input lead TERMINAL READY is energized; output lead NOT READY is pulsed if input lead TERMINAL READY is not energized. The pulse on either output lead READY or NOT READY is passed by way of OR gates 117 or 116, respectively, to input terminal leads READY or NOT READY of character detector generator and store 108, thus coding character detector generator and store 108 with the appropriate code character indicating the condition of the station receiver.

Selection logic 110 in response to the pulsing of lead CEC also energizes input terminal SW of output signal selector 105 to enable the passage of data from input terminal "1" of selector 105 to the output thereof. Finally, selection logic 110 sets itself to the receiver selected condition in response to the input pulse on lead CEC when input lead TERMINAL READY is energized.

When the message text is delivered by multistation line 200 the first character thereof is the end-of-heading character. This character, when recognized by character detector generator and store 108, results in the pulsing of output lead EOH. Selection logic 110, in turn, applies switching pulses to selectors 104, 105 and 112 and energizes output lead PRINT to unblind the data sink in terminal set 114. Accordingly, at this time, incoming data is passed by way of directional control 103, input signal selector 104, clock and sampler 106 and character detector generator and store 108 to printer selector 112. From printer selector 112 the message text is then passed by way of lead REC DATA to the data sink in terminal set 114. The message text is thereby recorded in terminal set 114 until the end-of-transmission character is detected by character detector generator and store 108, thus providing a pulse to output lead EOT. The output pulse on lead EOT is passed to selection logic 110, restoring it to its initial condition. In restoring selection logic 110 to its initial condition, the data sink in terminal set 114 is blinded and line station 101 is, in turn, restored to its initial condition.

Returning now to master control station 201 and assuming that none of the outlying stations designated by a heading responds that it is in a condition to receive a message, AND gate 234 is never enabled whereby station selected indicator 218 is never set. After all of the memory cells in receiver-ready store 212 and delivery list store 213 are examined, message waiting indicator 214 is reset, as previously described, and delivery initiation unit 215, in turn, is reset. With station selected indicator 218 in the reset condition, however, the pulsing of delivery unit 202 by comparator 221 via AND gate 239 is blocked by AND gate 241, precluding the delivery of the message. AND gate 242 is also pulsed, however, and since this gate is enabled by station selected indicator 218 in the reset condition, a pulse is passed to OR gate 250. Accordingly, with a pulse applied to OR gate 250 a new polling sequence is initiated without the delivery of a message. The message will be delivered subsequently, however, when an outlying addressee station responds during the polling cycle that it is available to receive a message.

Although a specific embodiment of this invention has been shown and described, it will be understood that various modifications may be made without departing from the spirit of this invention.

What is claimed is:

1. In a multistation line selection system, a plurality of station receivers on said line, a master controller for polling all of said stations and for transmitting messages to selected ones of said stations in accordance with data in the heading of the message, means at each station responsive to said polling for returning data indicating the readiness of the receiver thereat for recording messages and means for enabling said receiver for recording a message in response to the reception of an address code individual thereto, *characterized in that* said master controller includes means for storing said data returned from said stations and means for sending each address code designated by said data in the heading of the message when said returned data in said storing means indicates that said receiver individual thereto is ready.

2. In a multistation line selection system in accordance with claim 1 wherein said master controller further includes memory means responsive to the data in the heading of the message for listing each station of address designated and comparison means responsive to said memory means and said storing means for enabling said address code sending means when said memory means lists a station and said storing means indicates that the receiver thereat is ready.

3. In a multistation line selection system in accordance with claim 2 further including means for eliminating each station from said list of said memory means after the address code individual thereto is transmitted by said address code sending means.

4. A multistation line selection system comprising, a plurality of stations on said line, each station including a data recorder, a master controller including a transmitter for sending data messages having address headings, polling code sending means, and recorder selection code sending means, means at each of said stations responsive to the reception of polling code individual thereto for responding whether the data recorder thereat is ready to receive, further means at each of said stations responsive to the reception of selection code individual thereto for enabling the recorder thereat, means at said master controller for storing said station responses indicating whether the recorder thereat is ready, means contolled by the address heading in the data message in the transmitter for listing the identity of each station of address, and means operated when said listing means lists the identity of a station and said storing means stores a response that the recorder at the listed station is ready for enabling said selection code sending means.

5. In a multistation line selection system, a plurality of stations connected to said line, each of said stations including a data transmitter and a data receiver, a master controller including means operative during a polling state for sending selective polling codes to said stations and means operative during a call-in state for sending selective call-in codes to said stations, means at each station responsive to polling codes individual thereto for returning data indicating the availability of a data message in the transmitter thereat and the readiness of the receiver thereat, other means at each station responsive to call-in codes individual thereto for enabling the receiver thereat, a data transmitter for sending messages to selected ones of said station receivers in accordance with addresses in the heading of each message and means at said master controller enabled during said call-in state and responsive to said message heading for sending call-in codes to each station designated by said addresses when said designated station responded to polling codes that the receiver thereat is ready.

References Cited

UNITED STATES PATENTS

| | | | |
|---|---|---|---|
| 2,912,485 | 11/1959 | Kaufman et al. | 178—4.1 |
| 2,979,556 | 4/1961 | Anspach et al. | 178—3 |
| 3,046,525 | 7/1962 | Deming et al. | 340—163 |

EUGENE G. BOTZ, *Primary Examiner.*

U.S. Cl. X.R.

178—4.1; 340—163